United States Patent [19]

Levi

[11] 4,049,928

[45] Sept. 20, 1977

[54] SELF-ADJUSTING VOICE FREQUENCY REPEATER

[75] Inventor: Israel Levi, Ottawa, Canada

[73] Assignee: Northern Telecom Limited, Montreal, Canada

[21] Appl. No.: 701,151

[22] Filed: June 30, 1976

[51] Int. Cl.² ............................................. H04B 3/36
[52] U.S. Cl. ................................ 179/170 R; 179/16 F
[58] Field of Search ............. 179/16 F, 170 R, 170 T; 330/86

[56] References Cited

U.S. PATENT DOCUMENTS

| 3,914,560 | 10/1975 | Greene | 179/16 F |
| 3,989,906 | 11/1976 | Kiko | 179/170 R |
| 3,989,907 | 11/1976 | Chambers, Jr. | 179/170 R |

Primary Examiner—William C. Cooper
Assistant Examiner—Randall P. Myers
Attorney, Agent, or Firm—Achmed N. Sadik

[57] ABSTRACT

A self-adjusting voice frequency repeater for subscriber loops of varying ohmic resistances utilizing a multiplier-divider arrangement is disclosed.

5 Claims, 2 Drawing Figures

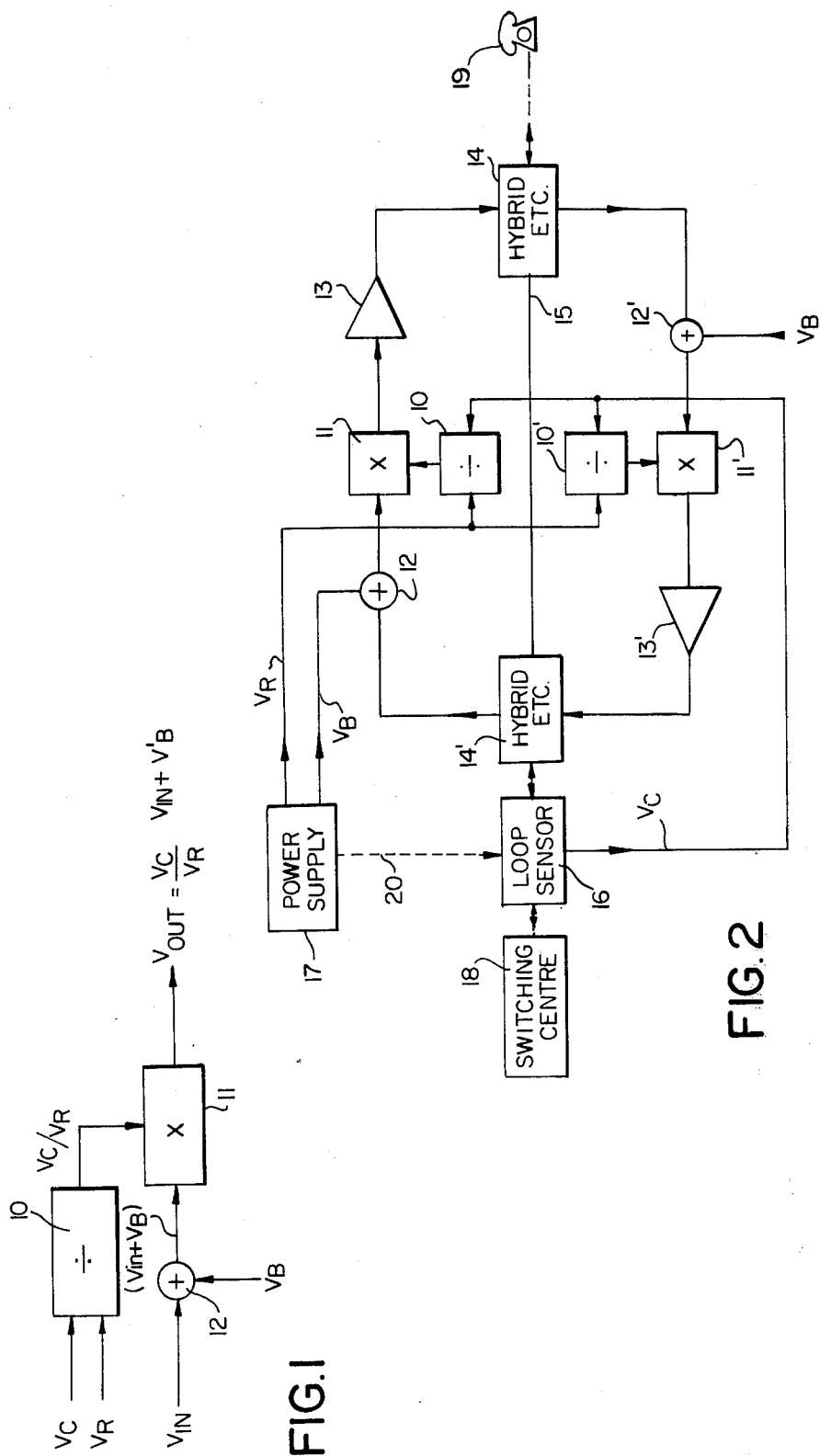

SELF-ADJUSTING VOICE FREQUENCY REPEATER

FIELD OF THE INVENTION

The present invention relates to repeaters in general, and particularly to self-adjusting voice frequency (VF) repeaters for VF telephone loops.

BACKGROUND AND PRIOR ART OF THE INVENTION

The present telephone network is an interconnected multi-node switching system, with each node serving a plurality of subscribers via twisted pairs of wire. The further the subscriber is from the switching node, the coarser the average aggregate gauge of his loop wire. Loops beyond a certain length having ohmic resistance larger than a certain maximum value, if they exist within the serviced area, must, in order to maintain the maximum permissible loss, utilize amplifying repeaters. In the recent past, the loop length beyond which repeating becomes necessary has been steadily declining due to the trend toward fine gauge wires, and possibly ultimately toward a unified fine gauge or "unigauge". The reasons, of course, are rising copper prices and declining cost of electronics.

If repeaters are used in the switching centres for longer loops, then it is most convenient for the operating companies to have a single standard repeater that self-adjusts its gain to fit the length of its loop. Two recent United States patents are directed to such self-adjusting repeaters. One is U.S. Pat. No. 3,903,378 issued Sept. 2, 1975 to David Q. Lee et al. It teaches the use of field effect transistors (FETs) as feedback elements to control the gain of associated amplifying devices in response to a voltage that is proportional to the loop length. The disadvantages of such simple arrangement is the lack of temperature stability of, and possibly the necessity of selecting, identical field effect transistors.

The second patent is U.S. Pat. No. 3,914,560 issued Oct. 21, 1975 to Clifford E. Greene, which patent teaches the use of the dynamic impedance of a d-c biased diode as the gain controlling element. Among the disadvantages of such arrangement are:

the a-c signal no matter how small still modulates the impedance of the diode causing harmonic distortion;

in order to minimize the above disadvantage, the VF signals are attenuated 40 to 50 dB before they are controlled to be reamplified thereafter, thus requiring low-noise high-gain amplifiers which are not inexpensive; and diode impedance varies considerably with temperature and is difficult to compensate.

The present invention endeavours to solve some of the above problems.

SUMMARY OF THE INVENTION

The repeater of the present invention does not require elaborate adjustments or calibrations, and it exhibits good temperature stability.

Thus, according to the present invention the self-adjusting voice frequency (VF) repeater for subscriber loops having ohmic resistances between two predetermined values comprises, in combination, means for dividing a control signal proportional to the loop resistance by a temperature-stable d-c reference signal, multiplying means responsive to the output of the diving means for multiplying said output by an input signal of said repeater, and buffer means responsive to said multiplying means for providing an output signal of said repeater, whereby a temperature generated error of said multiplying means is substantially cancelled by an opposite, temperature generated error of said dividing means.

Since some multiplier-dividers are capable of single quadrant operation only, a preferred version of the present invention is to superpose the input signal on a d-c bias, such that the total signal variation still fall within a single quadrant.

Still a further preferred version is to utilize a multiplier-divider having its error-producing, temperature sensitive transistors on a single, integral monolithic chip, to ensure optimal temperature tracking and hence optimal error cancellation.

BRIEF DESCRIPTION OF THE DRAWINGS

A preferred embodiment of the present invention will now be described in conjunction with the accompanying drawings in which:

FIG. 1 illustrates the operation of a multiplier-divider arrangement; and

FIG. 2 is a block diagram of a self-adjusting voice-frequency repeater according to the present invention utilizng the multiplier-divider arrangement of FIG. 1.

DESCRIPTION OF THE PREFERRED EMBODIMENT

Referring to FIG. 1 of the drawings, the divider-multiplier arrangement comprises a single-quadrant divider 10 for producing the quotient of the control voltage $V_C$ by the reference voltage $V_R$; a single-quadrant multiplier 11 for multiplying the quotient $V_C/V_R$ by the biased input signal $(V_{IN} + V_B)$ to produce an output signal $V_{OUT}$ $$V_{OUT} = (V_C/V_R)(V_{IN} + V_B) = (V_C/V_R)V_{IN} + V_B'$$

where $V_B'$ is an output d-c bias to be filtered out; and a summer 12 for superposing $V_{IN}$ and a d-c biasing voltage $V_B$ at the input of the multiplier 11.

$V_R$ is a stable reference voltage; the quotient $V_C/V_R$, however, due to temperature dependence of the divider 10, decreases with increasing temperature. This decrease of $V_C/V_R$ compensates an associated increase in the product $((V_C/V_R)V_{IN})$ that occurs in the multiplier 11. The result is a final output signal $V_{OUT}$, that is substantially independent of temperature instabilities; that is if the divider 10 and the multiplier 11 track. It is therefore opportune to utilize as the active elements of division and multiplication integral monolithic devices. A suitable multiplier divider circuit is fully disclosed in a book by Jerald G. Graeme entitled "Application of Operational Amplifiers" published by McGraw-Hill Book Company in 1973, pp 100–102. Such multiplier divider as disclosed therein in FIG. 3.29, p. 101, has been found highly satisfactory when the transistors are integrated on a single monolithic chip.

FIG. 2 of the drawings is a block diagram depicting a repeater between a switching centre 18 and a subscriber apparatus 19. The repeater comprises for one direction of transmission; the divider 10, the multiplier 11 and the summer 12 arranged as described above in conjunction with FIG. 1; a buffer amplifier 13 fed by the output signal of the multiplier 11; the amplifier 13 itself feeds a hybrid 14 which interfaces the repeater with the subscriber loop ending in the subscriber apparatus 19; a loop sensor 16 supplies the control voltage $V_C$ which is proportional to the subscriber loop resistance (and hence length) between the hybrid 14 and the subscriber apparatus 19; the loop sensor 16 senses the length of the loop via the other hybrid 14' and the d-c continuity path 15 that extends all the way to the subscriber apparatus 19; and a power supply 17 providing the reference voltage $V_R$ as well as the input biasing voltage $V_B$, the power supply 17 may also (as in many applications) provide the loop sensor 16 with boosting d-c power for the loop via connection 20. For the other direction of transmission, the components designated with primed numbers provide the same functions as those just described. Of course, the hybrids 14 and 14', the loop sensor 16 and the power supply 17 serve both directions of repeatering. Further, while in most cases the repeater is situated in the switching centre, this is by no means a necessary requirement.

The summer 12 (and 12') is simply two resistors having one common junction, which is connected to the multiplier 11 (and 11').

The output d-c bias $V_B'$, since it is not required, is filtered out easily by a blocking capacitor and a discharge resistor to ground at the output of the multiplier 11 (and 11') in the event that the buffer amplifier 13 (and 13') is d-c coupled at its input.

The repeater of FIG. 2 operates as follows. The loop sensor 16 supplies a constant current to the subscriber loop between the hybrid 14 and the subscriber apparatus 19 via the hybrid 14'; the d-c continuity path 15 and the hybrid 14. The voltage applied to the subscriber loop to maintain a prescribed constant current is proportional to the resistance, and hence to the length of the loop. The control voltage $V_C$ is derived from that voltage and varies between lower and upper limits prescribed by the minimum and maximum repeater gain required by the specifications. The control voltage $V_C$ is thus applied to the dividers 10 and 10' and controls the magnitude of output signal $V_{OUT}$ as described in conjunction with FIG. 1. The buffer amplifiers 13 and 13' provide a constant gain factor, such that at minimum control voltage $V_C$, in the case of the shortest anticipated loop, the total gain of the repeater is the minimum required gain for such loop lengths. The temperature stable reference voltage usually equals the minimum value of the control voltage $V_C$ which typically varies from +4 to +9 volts. The biasing voltage $V_B$ is +15 volts, given an input signal with a range from 0 to 4 volts peak, an input summing resistance of 200 Kohm and a bias voltage summing resistance of 510 Kohm.

What is claimed is:

1. A self-adjusting voice-frequency repeater for subscriber loops having ohmic resistances between two predetermined values comprising, in combination: means for dividing a control signal proportional to the loop resistance by a temperature-stable d-c reference signal; multiplying means responsive to the output of the dividing means for multiplying said output by an input signal of said repeater; and buffer means responsive to said multiplying means for providing an output signal of said repeater, whereby a temperature generated error of said multiplying means is substantially cancelled by an opposite, temperature generated error of said dividing means.

2. The repeater of claim 1, said dividing and said multiplying means being single quadrant devices, and said input signal being superposed on a d-c biasing signal to fall within a single quadrant.

3. The repeater of claim 2, said dividing and said multiplying means having their error-producing, temperature sensitive transistors on a single common monolithic chip.

4. The repeater of claim 3, said control signal being a voltage between upper and lower limits, and said reference signal being a single value voltage.

5. The repeater of claim 4, said single value voltage being equal to said lower limit of said control signal voltage.

* * * * *